United States Patent [19]

Fluck et al.

[11] 4,164,277
[45] Aug. 14, 1979

[54] SYSTEM FOR CHARGING A PLURALITY OF PROCESSING MACHINES

[75] Inventors: René Fluck, Schleitheim; Franz Rüegg, Neuhausen am Rheinfall, both of Switzerland

[73] Assignee: SIG Schweizerische Industrie-Gesellschaft, Neuhausen am Rheinfall, Switzerland

[21] Appl. No.: 873,538

[22] Filed: Jan. 30, 1978

[30] Foreign Application Priority Data

Jan. 28, 1977 [CH] Switzerland .................. 1090/77

[51] Int. Cl.² .......................................... B65G 47/51
[52] U.S. Cl. .................................. 198/369; 198/442; 198/458
[58] Field of Search ............... 198/360, 367, 369, 370, 198/425, 442, 458

[56] References Cited

U.S. PATENT DOCUMENTS

| | | | |
|---|---|---|---|
| 2,827,150 | 3/1958 | Eaton et al. | 198/425 |
| 3,193,078 | 7/1965 | Amenta et al. | 198/425 |
| 3,240,314 | 3/1966 | Griner | 198/458 |
| 3,593,624 | 7/1971 | Dufour | 198/442 |
| 3,930,572 | 1/1976 | Fluck et al. | 198/367 |

*Primary Examiner*—Jeffrey V. Nase
*Attorney, Agent, or Firm*—Spencer & Kaye

[57] ABSTRACT

A conveyor system for charging at least two processing machines with flat items includes a trunk conveyor belt; at least eight parallel, spaced channels oriented in the conveying direction of the trunk conveyor belt for guiding the items on the trunk conveyor belt in at least eight rows; and a separate feeder aligned with each channel for receiving the items from the associated channel and for depositing identical groups of items on at least two conveyor tracks arranged above and transversely to the trunk conveyor belt for advancing the item groups to the processing machines arranged at a respective discharge end of the conveyor tracks. With each feeder there is associated a separate ramp; each ramp has an inlet end adjoining the trunk conveyor belt for receiving the items from the associated channel and an outlet end operatively coupled with the associated feeder for introducing the items thereinto from the associated ramp.

9 Claims, 10 Drawing Figures

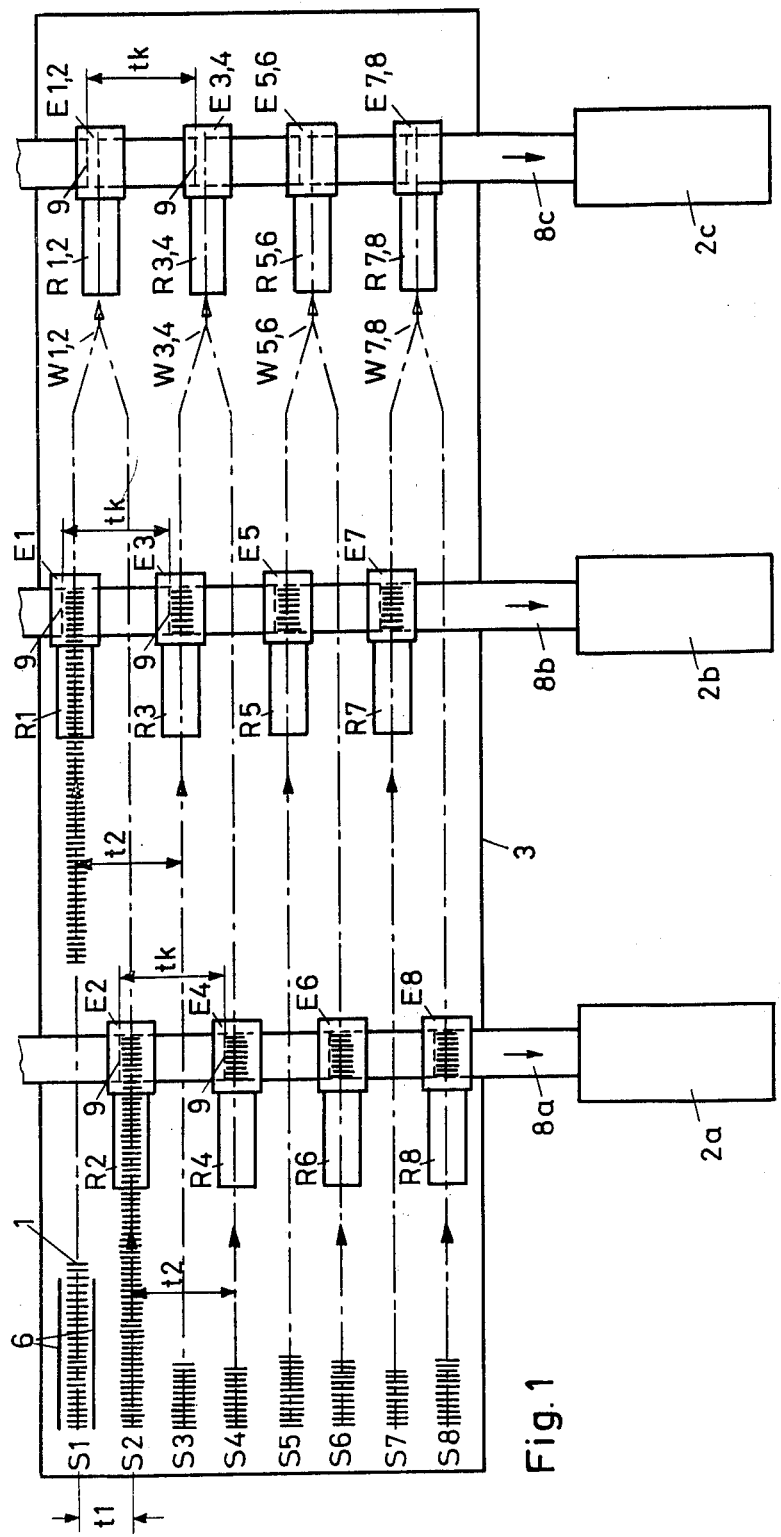
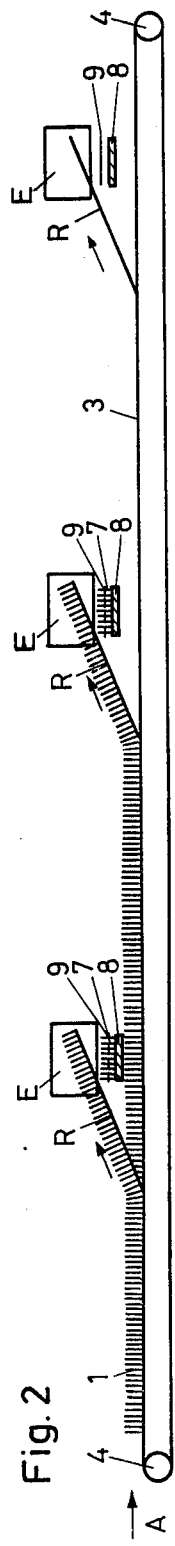
Fig. 1
Fig. 2

SYSTEM FOR CHARGING A PLURALITY OF PROCESSING MACHINES

BACKGROUND OF THE INVENTION

This invention relates to a system for charging at least two processing machines with flat articles such as cookies which are advanced to feeders in an upright orientation on a trunk conveyor belt in at least eight rows. The feeders deposit identical groups of articles onto at least two conveyor tracks which are oriented transversely to the trunk conveyor belt and which advance the article groups to processing machines positioned at the discharge end of the conveyor tracks.

Systems of the above-outlined known type have the disadvantage that they require substantial space and they are of unclear (cluttered) design. Further, they require a great number of conveyor belts.

SUMMARY OF THE INVENTION

It is an object of the invention to provide an improved system of the above-outlined type from which the discussed disadvantages are eliminated.

This object and others to become apparent as the specification progresses, are accomplished by the invention, according to which, briefly stated, the conveyor system for charging at least two processing machines with flat items includes a trunk conveyor belt; at least eight parallel, spaced channels oriented in the conveying direction of the trunk conveyor belt for guiding the items on the trunk conveyor belt in at least eight rows; and a separate feeder aligned with each channel for receiving the items from the associated channel and for depositing identical groups of items on at least two conveyor tracks arranged above and transversely to the trunk conveyor belt for advancing the item groups to the processing machines arranged at a respective discharge end of the conveyor tracks. With each feeder there is associated a separate ramp; each ramp has an inlet end adjoining the trunk conveyor belt for receiving the items from the associated channel and an outlet end operatively coupled with the associated feeder for introducing the items thereinto from the associated ramp.

The articles belonging to adjoining rows or row pairs are advanced by the various conveyor tracks on the ramps to feeders serving different processing machines.

According to a feature of the invention, between the trunk conveyor belt (which advances the article rows) and the article feeders, there are provided switchable ramps so that the articles, for example cookies, delivered by a baking oven may be advanced selectively to feeders which are associated with the machine to be charged (such as a packaging machine) or may be routed to standby feeders associated with another (standby) packaging machine.

BRIEF DESCRIPTION OF THE DRAWINGS

FIG. 1 is a schematic top plan view of a preferred embodiment of the system according to the invention.

FIG. 2 is a schematic side elevational view of the same embodiment.

DESCRIPTION OF THE PREFERRED EMBODIMENTS

Figure 3:
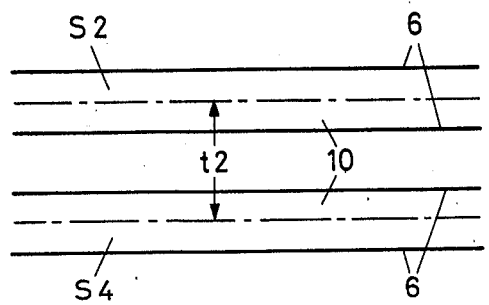
FIG. 3 is a schematic top plan view of a detail of FIG. 1.

The system illustrated in FIGS. 1 and 2 serves to advance measured groups of flat items 1 (such as cookies) to two packing machines 2a and 2b or, in addition, also to a standby packing machine 2c in case breakdown occurs in one of the machines 2a or 2b. The system has an endless trunk conveyor belt 3 of substantial width, supported by rolls 4 at its ends. The items 1 are advanced to the trunk conveyor 3 in the direction of the arrow A and are deposited thereon upright (edgewise) in eight parallel extending, identically spaced rows S designated at S1 through S8. Each item row S is laterally guided by walls 6 constituting guide channels 10 (shown only for the beginning portion of the row S1 in FIG. 1). With each row S defined by sidewalls 6 there is associated a ramp R designated at R1 through R8 which leads to an associated feeder E designated at E1 through E8. The function of the feeders is to deposit a counted group of items on stationary tracks 8a, 8b or 8c which extend transversely to the trunk belt 3 and lead to the respective machines 2a, 2b or 2C. The item groups 7 are advanced on the respective track 8 to the associated processing machine by means of a carrier chain 9 (only symbolically shown). Feeders which separate counted article groups in a gentle manner from an article row and deposit them on a conveyor track are disclosed, for example, in Swiss Pat. No. 568,905 to which corresponds U.S. Pat. No. 3,930,572.

As seen in FIG. 1, the items of rows S2, S4, S6 and S8 are, in groups, deposited on the track 8a with the aid of associated respective ramps R2, R4, R6 and R8 and feeders E2, E4, E6 and E8 and are advanced to the packing machine 2a by the respective carrier chain 9 displacing the article groups on and along the conveyor track 8a. The items taken from the rows S1, S3, S5 and S7 are advanced on the conveyor track 8b in a similar manner to the machine 2b with the aid of ramps R1, R3, R5 and R7, as well as feeders E1, E3, E5 and E7. Designating the mutual distance between neighboring rows S1–S8 with t1, the distance between the rows from which items are taken for charging the processing machne 2a, on the one hand, and the processing machine 2b, on the other hand, that is, the distance, for example, between rows S1 and S3 or the distance between rows S2 and S4 is t2=2t1. If the distance between the carrier members on each chain 9 is tk=t2, then, for example, after every four steps of the chain 9, by means of a simultaneous actuation of the feeders E2, E4, E6 and E8, four consecutive carrier members of the chain 9 may each be provided with an item group 7, so that for each chain step one item group 7 is admitted to the machine 2a. It is noted that other relationships of the chain division tk and row division t2 and different actuating sequences concerning the feeders E are feasible.

Figure 4:
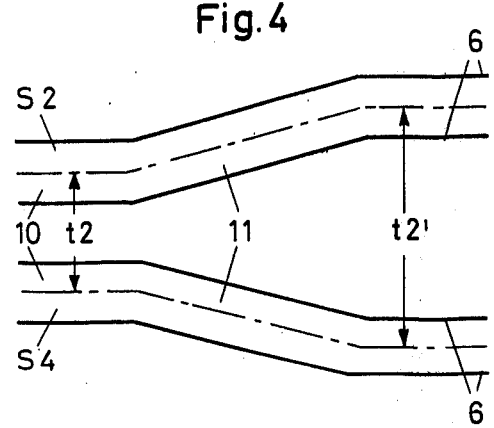
FIG. 4 is a schematic top plan view of a variant of the arrangement shown in FIG. 3.
Figure 10:
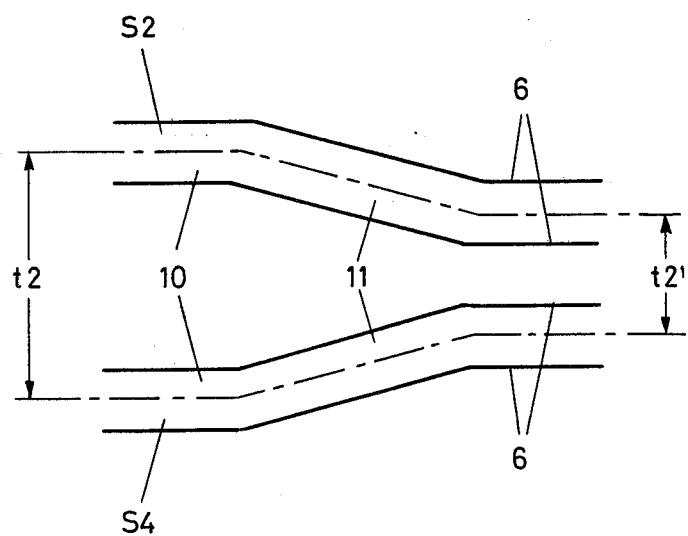
FIG. 10 is a schematic top plan view of a variant of the arrangement shown in FIG. 3.

In two variants illustrated in FIGS. 4 and 10, the item groups 7 taken from the rows S2 and S4 arrive on the track 8a at a mutual distance t2' which is greater (FIG. 4) or smaller (FIG. 10) than the mutual distance t2. For this purpose, the channels 10 on the trunk belt 3 and/or the ramps R2 and R4 formed by the guide walls 6 are, unlike in the embodiment shown in FIGS. 1 and 3, not parallel throughout, but have portions 11 which are divergent (FIG. 4) or convergent (FIG. 10). Such a distance alteration may be advantageous on occasion regarding structural considerations. In such a case, however, the ratio t2'/t2 should deviate only slightly from 1 in order to avoid sudden changes of directions or long channels. In particular, expediently the following relationship should exist:

$$0.7 < t2'/t2 < 1.4.$$

Figure 5:
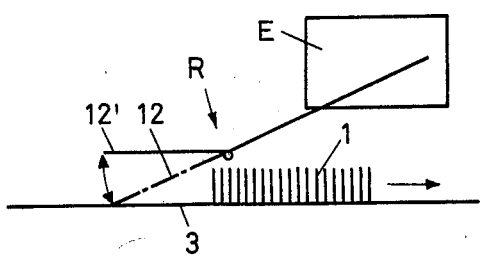
FIG. 5 is a schematic side elevational view of an enlarged detail of FIGS. 1 and 2.
Figure 7:
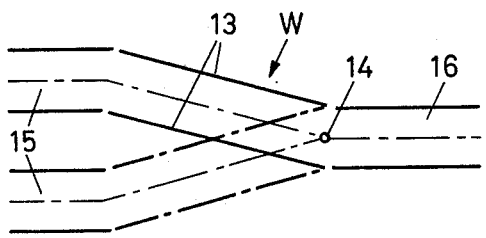
FIG. 7 is a schematic top plan view of a detail shown in FIG. 1.

Turning now to FIG. 5, the ramps R are not fixedly secured to the machine frame, but have a vertically pivotable inlet portion 12. In case the inlet portion 12 is in its downwardly pivoted position (shown in dash-dot lines), the free terminus (inlet end) of the inlet portion 12 is situated close to the trunk conveyor belt 3, so that the items 1 advanced on the trunk conveyor belt 3 pass to the ramp and at the outlet end thereof are transferred to the associated feeder E. If, on the other hand, the inlet portion 12 is in its upwardly pivoted position 12' (shown in solid lines), the items 1 of the respective row, for example, row S1, pass underneath the ramp R1 and, as it may be particularly well seen in FIG. 1, reach a diverter W1,2 which advances the items over the standby ramp R1,2 to the standby feeder E1,2 and the standby conveyor track 8c associated with the standby packing machine 2c. Each diverter W, as seen in FIG. 7, essentially comprises two parallel guide walls 13 which are pivotal about an axis 14 in order to selectively advance the items, arriving from the one or the other of two inlet channels 15, to the outlet channel 16 provided on the standby ramp R1,2.

Figure 6:
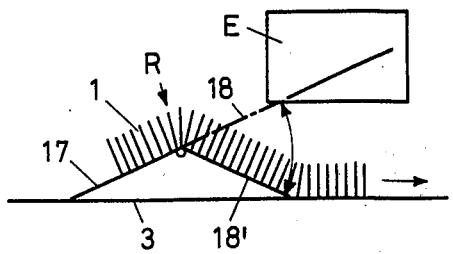
FIG. 6 is a schematic side elevational view of a variant of the arrangement shown in FIG. 5.

Turning now to the modification illustrated in FIG. 6, the ramp R has a stationary initial portion 17 to which there is articulated, for a vertical pivotal motion, a central part 18. If the central part 18 is in its downwardly pivoted position 18' (shown in solid lines), the items 1 pushed onto the initial portion 17 are re-introduced by the central portion 18 onto the trunk belt 3, thus leaving the respective feeder E uncharged.

The selection of the particular ramp variants according to FIG. 5 or FIG. 6 depends on the particular properties of the items 1.

Figure 9:
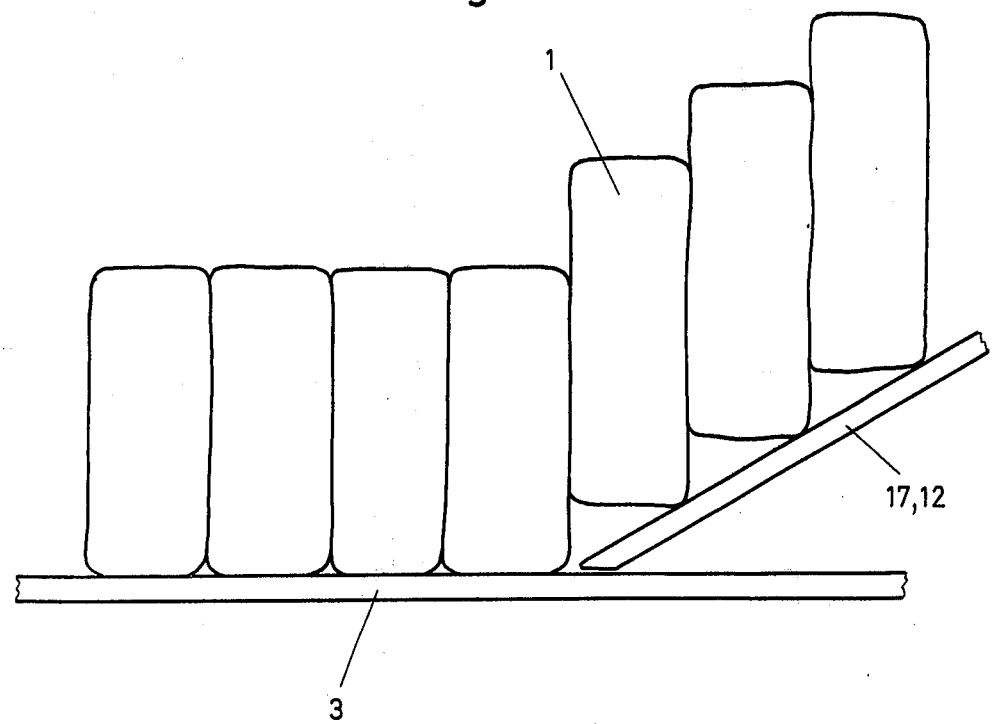
FIG. 9 is a schematic side elevational view, on an enlarged scale, of one detail of the structure shown in FIG. 2.

FIG. 9 illustrates the positional relationship between the trunk belt 3 and the terminus of the inlet portion 12 or 17 of the ramp R and further shows how the items 1 (which are in a face-to-face contact with one another) are transferred from the trunk belt 3 to the ramp R and are moved upwardly on the latter by the pushing force derived from the force that advances the trunk belt 3.

Figure 8:
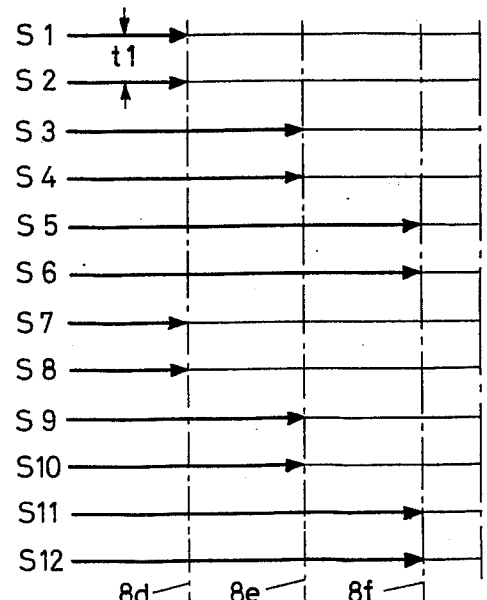
FIG. 8 is a diagrammatic top plan view of another preferred embodiment of the system according to the invention.

Turning now to FIG. 8, there is shown the inlet portion of a system according to another preferred embodiment of the invention. In this case there are provided twelve items rows S1-S12, only symbolically illustrated by arrows. These twelve rows S serve for charging three packing machines 2d, 2e and 2f. The items of the rows S1 and S2 are well as S7 and S8 are deposited in groups onto the conveyor track 8d with the aid of respective ramps and feeders, not shown. The rows S3, S4 and S9, S10 feed the conveyor track 8e, while the rows S5, S6 and S11, S12 feed the conveyor track 8f. While in the embodiment described in connection with FIG. 1 the items of neighboring rows, for example rows S1 and S2 or S5 and S6 are, in each instance, advanced to a different machine 2a or 2b according to the embodiment illustrated in FIG. 8, the items of neighboring row pairs, for example, rows pairs S1, S2 and S3, S4 or S9, S10 and S11, S12 are advanced to a different machine 2d, 2e or 2e, 2f. In this embodiment too, a standby packing machine (not shown) may be provided for which then a corresponding number of diverters is needed and further, the ramps have to be designed as switchable ramps as described in connection with FIGS. 5 or 6.

It is to be understood that the quantity n of the rows S and the quantity m of the packing machines to be charged may be varied within wide limits. Thus, for example, the three packing machines shown in FIG. 8 may be charged with the aid of fifteen or sixteen item rows, while care is taken that the items of adjoining rows are directed to different machines. In case sixteen item rows feed three packing machines, two packing machines are provided with five feeders each and one packing machine is provided with six feeders.

In the systems described above, the ramps R may have relatively short lengths which overlap only a small portion of the trunk conveyor belt 3 for supplying the feeders E add thus the transverse conveyor tracks 8. Changes in the direction of the orientation of the rows S, if any, are only slight, and are, as a rule, preferably avoided altogether.

It will be understood that the above description of the present invention is susceptible to various modifications, changes and adaptations, and the same are intended to be comprehended within the meaning and range of equivalents of the appended claims.

What is claimed is:

1. In a conveyor system for charging at least two processing machines with flat items, including a trunk conveyor belt; means defining at least eight parallel, spaced channels oriented in the conveying direction of the trunk conveyor belt for guiding the items on the trunk conveyor belt in at least eight rows; a separate feeder aligned with each channel for receiving the items from the associated channel and for depositing identical groups of items on at least two conveyor tracks arranged above and transversely to the trunk conveyor belt for advancing the item groups to the processing machines arranged at a respective discharge end of the conveyor tracks, the improvement wherein with each said feeder there is associated a separate ramp; each ramp having an inlet end adjoining the trunk conveyor belt for receiving the items from the associated channel and an outlet end operatively coupled with the associated feeder for introducing the items thereinto from the associated ramp; each ramp including movable means for setting the ramp into an operative position in which the items advancing in the respective channel are transferred to the ramp from the trunk conveyor belt and an inoperative position in which the items advancing in the respective channel pass by the ramp without being transferred thereto; the improvement further comprising a standby conveyor track arranged above and transversely to the trunk conveyor belt and downstream of said conveyor tracks as viewed in the direction of item feed on said trunk conveyor belt; a plurality of standby feeders coupled to said standby conveyor track; a separate standby ramp associated with each standby feeder; each standby ramp having an inlet end operatively connected to the trunk conveyor belt and an outlet end operatively connected to the associated standby feeder; and a separate diverter coupled to the inlet end of each standby ramp; each said diverter having means for selectively advancing, to the standby ramp associated therewith, items forwarded on said trunk conveyor belt in a plurality of said channels beyond the respective said ramps for charging a standby processing machine arranged at a discharge end of said standby conveyor track.

2. A conveyor system as defined in claim 1, wherein the ramps associated with adjoining channels are connected to feeders associated with different processing machines.

3. A conveyor system as defined in claim 1, wherein adjoining channels form channel pairs; and wherein the ramps associated with any said channel pair are connected to feeders associated with the same processing machine and the ramps associated with adjoining channel pairs are connected to feeders associated with different processing machines.

4. A conveyor system as defined in claim 1, wherein said movable means comprises a first ramp portion pivotally attached to a second, stationary ramp portion for movement in a substantially vertical plane towards or away from the trunk conveyor belt into said operative or inoperative position, respectively.

5. A conveyor system as defined in claim 4, wherein said first ramp portion is connected to said second ramp portion upstream thereof as viewed in the direction of item feed on said trunk conveyor belt; in said operative portion of said ramp, said first ramp portion slopes upwardly from said trunk conveyor belt towards said second ramp portion.

6. A conveyor system as defined in claim 4, wherein said first ramp portion is connected to said second ramp portion downstream thereof as viewed in the direction of item feed on said trunk conveyor belt; in said operative position of said ramp said first ramp portion slopes downwardly from said second ramp portion towards said trunk conveyor belt.

7. A conveyor system as defined in claim 1, wherein the center-to-center distance between adjacent two channels associated with the same conveyor track constitutes a first distance; the improvement further comprising non-parallel channel portions changing said first distance to a second distance at the respective two feeders associated with said adjacent two channels; the ratio of said second distance to said first distance is greater than 0.7 and smaller than 1.4.

8. A conveyor system as defined in claim 7, wherein said non-parallel channel portions are divergent in the feed direction of said trunk conveyor belt.

9. A conveyor system as defined in claim 7, wherein said non-parallel channel portions are convergent in the feed direction of said trunk conveyor belt.

* * * * *